United States Patent
Zhou et al.

(10) Patent No.: US 12,021,800 B2
(45) Date of Patent: Jun. 25, 2024

(54) TOPIC GUIDING IN A CONVERSATION

(71) Applicant: Microsoft Technology Licensing, LLC, Redmond, WA (US)

(72) Inventors: Feng Zhou, Redmond, WA (US); Ying Zou, Redmond, WA (US); Sa Kang, Redmond, WA (US); Xiang Xu, Redmond, WA (US); Yue Liu, Redmond, WA (US); Min Zeng, Redmond, WA (US); Di Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 623 days.

(21) Appl. No.: 17/056,972

(22) PCT Filed: Jun. 25, 2018

(86) PCT No.: PCT/CN2018/092697
§ 371 (c)(1),
(2) Date: Nov. 19, 2020

(87) PCT Pub. No.: WO2020/000147
PCT Pub. Date: Jan. 2, 2020

(65) Prior Publication Data
US 2021/0203623 A1 Jul. 1, 2021

(51) Int. Cl.
*G10L 15/22* (2006.01)
*G06F 40/20* (2020.01)
*H04L 51/02* (2022.01)

(52) U.S. Cl.
CPC .............. *H04L 51/02* (2013.01); *G06F 40/20* (2020.01); *G10L 15/22* (2013.01)

(58) Field of Classification Search
CPC ...................................................... G10L 15/22
See application file for complete search history.

(56) References Cited

U.S. PATENT DOCUMENTS 9,865,260 B1 * 1/2018 Vuskovic ............... G06F 40/295
2014/0310001 A1 * 10/2014 Kalns ..................... G10L 15/30
704/270.1

(Continued)

FOREIGN PATENT DOCUMENTS

CN    105975511 A    9/2016
CN    106777364 A    5/2017

(Continued)

OTHER PUBLICATIONS

"International Search Report and Written Opinion Issued in PCT Application No. PCT/CN18/092697", dated Mar. 20, 2019, 9 Pages.

(Continued)

*Primary Examiner* — Jialong He
(74) *Attorney, Agent, or Firm* — Schwegman Lundberg & Woessner, P.A.

(57) ABSTRACT

The present disclosure provides method and apparatus for guiding topic in a conversation between a user and a chat engine. At least one first topic is determined. A first message is provided to the user based on the at least one first topic, to guide the conversation to the at least one first topic. A first response to the first message is received from the user. It is determined whether the first response is associated with the at least one first topic. In the case of determining that the first response is associated with the at least one first topic, at least one second topic is determined based on the at least one first topic. At least one second message is provided based at least on the at least one second topic, wherein if the at least one second topic is associated with resource or service, the at least one second message includes at least the resource or service.

20 Claims, 13 Drawing Sheets

(56) References Cited

U.S. PATENT DOCUMENTS

| | | | |
|---|---|---|---|
| 2015/0178371 A1 | 6/2015 | Seth et al. | |
| 2016/0371393 A1* | 12/2016 | Allen | G06F 16/93 |
| 2017/0103343 A1* | 4/2017 | Yee | G06N 7/01 |
| 2018/0129752 A1* | 5/2018 | Blomberg | G06F 16/334 |
| 2019/0172069 A1* | 6/2019 | Eisenzopf | H04M 3/5175 |
| 2020/0143797 A1* | 5/2020 | Manoharan | G10L 15/22 |
| 2020/0356630 A1* | 11/2020 | Silverstein | G06F 16/3329 |

FOREIGN PATENT DOCUMENTS

| | | |
|---|---|---|
| CN | 107193978 A | 9/2017 |
| CN | 107870994 A | 4/2018 |
| CN | 108000526 A | 5/2018 |

OTHER PUBLICATIONS

"Office Action Issued in Chinese Patent Application No. 201880057126. 9", dated Feb. 28, 2023, 9 Pages.

Office Action Received for Chinese Application No. 201880057126. 9, mailed on Nov. 30, 2023, 8 Pages (English Translation Provided).

Second Office Action Received for Chinese Application No. 201880057126.9, mailed on Apr. 22, 2024, 4 Pages (English Translation Provided).

\* cited by examiner

TOPIC GUIDING IN A CONVERSATION

CROSS-REFERENCE TO RELATED APPLICATION

This application is a U.S. National Stage Filing under 35 U.S.C. 371 of International Patent Application Serial No. PCT/CN2018/092697, filed Jun. 25, 2018, and published as WO 2020/000147 A1 on Jan. 2, 2020, which application and publication are incorporated herein by reference in their entirety.

BACKGROUND

Artificial Intelligence (AI) chatbot is becoming more and more popular, and is being applied in an increasing number of scenarios. The chatbot is designed to simulate people's conversation, and may chat with users by text, speech, image, etc. Generally, the chatbot may scan for keywords within a message input by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for guiding topic in a conversation between a user and a chat engine. At least one first topic is determined. A first message is provided to the user based on the at least one first topic, to guide the conversation to the at least one first topic. A first response to the first message is received from the user. It is determined whether the first response is associated with the at least one first topic. In the case of determining that the first response is associated with the at least one first topic, at least one second topic is determined based on the at least one first topic. At least one second message is provided based at least on the at least one second topic, wherein if the at least one second topic is associated with resource or service, the at least one second message includes at least the resource or service.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
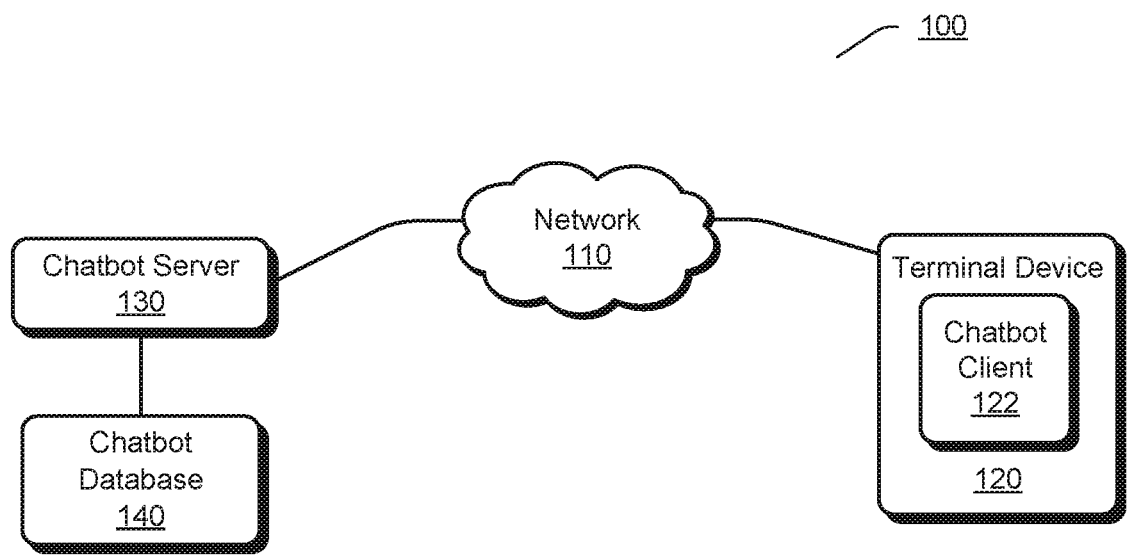
FIG. 1 illustrates an exemplary network architecture deploying a chatbot according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Conversational AI chat system is tending to be one of the most impressive directions in AI field in recent years. In recent years, the interaction mode of a user and an open domain chatbot is mainly based on providing answers. However, this sort of reply mode may make the chatbot being passive and may bring unsatisfied experience.

Embodiments of the present disclosure propose a solution which could make chatbot having a capability of guiding a conversation between a user and a chatbot step-by-step to a specific topic or a target topic, and optionally, recommend related resource, such as article, music, image, video, or service such as ticket subscription service, software application to users, and so on. This can enhance interaction experience of the user and can provide or add business value to the conversation. The conversation may refer to a time-continuous dialog between two chatting participants, which may include messages and responses in the dialog. Herein "message" refers to any information inputted by one of chatting participant, for example, the chatbot or the user, e.g., queries/questions/gossip from one chatting participant, answers of one chatting participant to questions from the other, documents indicated by chatting participant, opinions of chatting participant, etc., and "response" refers to any information provided by the other chatting participant, for example, the user or the chatbot, e.g., answers/replies to questions from one chatting participant, comments of the chatting participant, etc. The term "message" and the term "query" may also be interchangeably used. Herein "message" and "response" may be used interchangeably, for example, a message may be provided by the user or the chatbot, and a corresponding response may be provided by the chatbot or the user.

The specific topic or the target topic may be associated with resource or service, for example, recommended product, subscription service, application of one or more partners, etc., and may be guided from an initial topic which may be not associated with the resource or service, by a chatbot. The topic which is not associated with the resource or service may also be called as "implicit topic" herein. For example, in a scenario of conversation between a user and a chatbot, the chatbot may provide an initial topic to the user at first, and guide the conversation from the initial topic to a specific or target topic based at least on the user's response. The target topic herein may also be called as "explicit topic" which is associated with resource or service. Such topic guiding may be controlled by the chatbot and the topics may be switched dynamically during the conversation until reaching the target topic. Further, high quality resource or service may be delivered by the chatbot through step-by-step recommendation, which may be easy to be accepted by the user and there may be satisfied experience of the user.

FIG. 1 illustrates an exemplary network architecture 100 deploying a chatbot according to an embodiment.

In FIG. 1, a network 110 is applied for interconnecting among a terminal device 120 and a chatbot server 130.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be desktop computers, laptops, tablets, smart phones, AI terminals, etc. Although only one terminal device is shown in FIG. 1, it should be appreciated that a different number of terminal devices may connect to the network 110.

In an implementation, the terminal device 120 may be used by a user. The terminal device 120 may include a chatbot client 122 which may provide automated chatting service for the user. In some cases, the chatbot client 122 may interact with the chatbot server 130. For example, the chatbot client 122 may transmit messages to the chatbot server 130, and receive responses associated with the messages from the chatbot server 130. However, it should be appreciated that, in other cases, instead of interacting with the chatbot server 130, the chatbot client 122 may also locally generate responses to messages inputted by the user.

The chatbot server 130 may connect to or incorporate a chatbot database 140. The chatbot database 140 may comprise information that can be used by the chatbot server 130 for generating messages and/or responses.

It should be appreciated that all the network entities shown in FIG. 1 are exemplary, and depending on specific application requirements, any other network entities may be involved in the application scenario 100.

Figure 2:
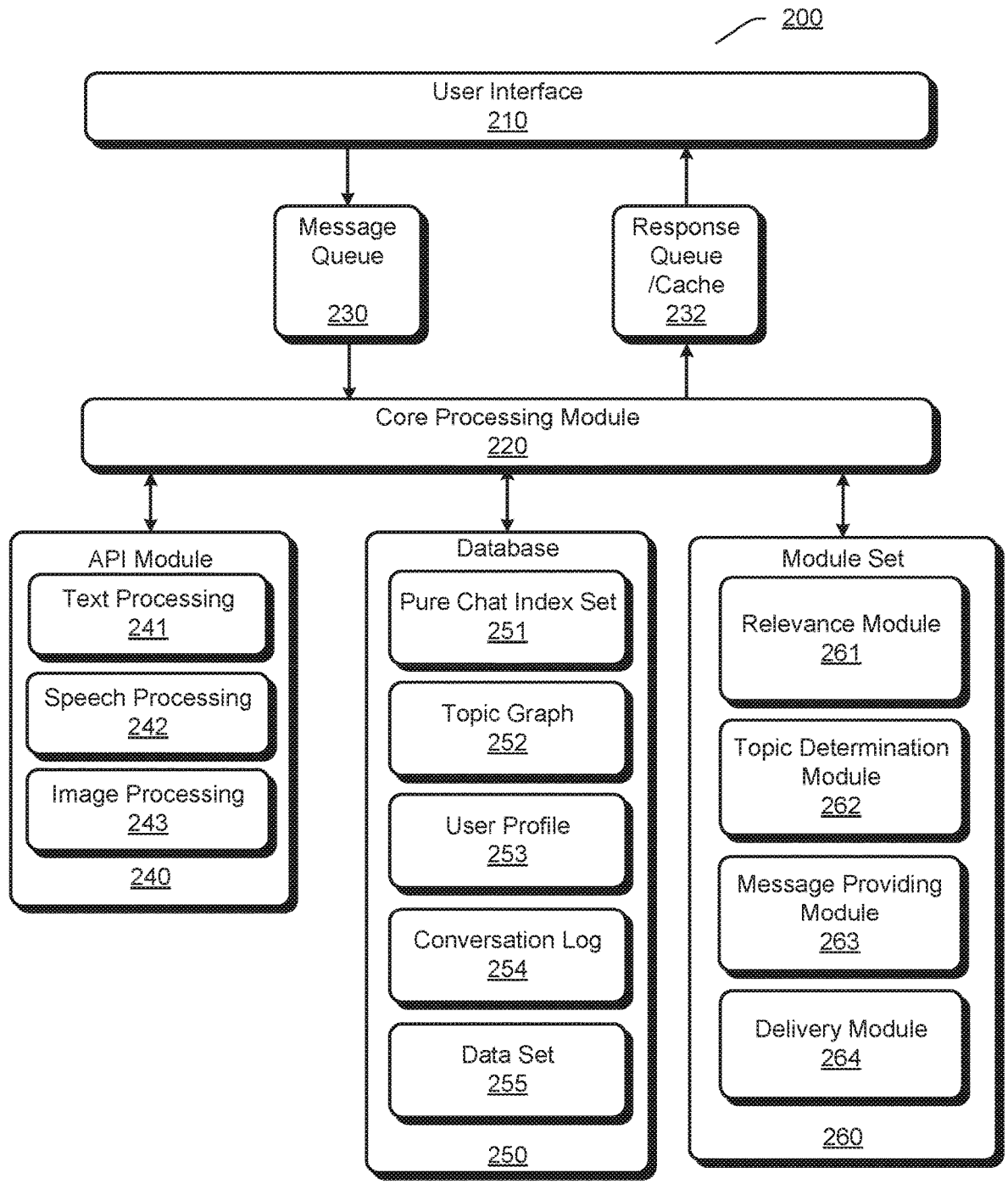
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The chatbot system 200 may obtain messages in the chat window, and store the messages in the message queue 230. The messages may be in various multimedia forms, such as, text, speech, image, video, etc.

The core processing module 220 may process the messages in the message queue 230 in a first-in-first-out manner. The core processing module 220 may invoke processing units in an application program interface (API) module 240 for processing various forms of messages. The API module 240 may comprise a text processing unit 241, a speech processing unit 242, an image processing unit 243, etc.

For a text message, the text processing unit 241 may perform text understanding on the text message, and the core processing module 220 may further determine a text response.

For a speech message, the speech processing unit 242 may perform a speech-to-text conversion on the speech message to obtain text sentences, the text processing unit 241 may perform text understanding on the obtained text sentences, and the core processing module 220 may further determine a text response. If it is determined to provide a response in speech, the speech processing unit 242 may perform a text-to-speech conversion on the text response to generate a corresponding speech response.

For an image message, the image processing unit 243 may perform image recognition on the image message to generate corresponding texts, and the core processing module 220 may further determine a text response. In some cases, the image processing unit 243 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through a database 250. The database 250 may comprise a plurality of index items that can be retrieved by the core processing module 220 for determining responses.

The database 250 may comprise a pure chat index set 251. The pure chat index set 251 may comprise index items that are prepared for free chatting between the chatbot and users, and may be established with data from, e.g., social networks. The index items in the pure chat index set 251 may or may not be in a form of question-answer (QA) pair, e.g., <question, answer>. Question-answer pair may also be referred to as message-response pair.

The database 250 may comprise a topic graph 252. Herein, the topic graph 252 may refer to a single topic graph or a plurality of topic graphs in various domains. The topic graph 252 may reflect conversational topic distribution and shifting which may be learned from massive chat conversation corpus. Each topic in the topic graph may be indicated by a word or phrase in a message. Each topic may be shown as a node in the topic graph. The topic graph 252 may be built by utilizing various word alignment models cross different domains, for example, word-alignment model 1 of IBM.

There may be some types of topics in the topic graph, for example, initial topic, intermediate topic and target topic, or implicit topic, explicit topic. Herein the intermediate topic may refer to a node in the topic graph which is interconnected between initial topic and target topic and may be not associated with the resources or services. The implicit topic may refer to the initial topic or the intermediate topic which is not associated with the resources or services. In contrast, the explicit topic may refer to the target topic which may be associated with resources or services to be delivered.

The database 250 may comprise a user profile 253. The user profile 253 may comprise personalized information of a user. For example, the user profile 253 may comprise the user's gender, age, location information, interested topics, hobbies, preference, etc.

The database 250 may comprise a conversation log 254. The conversation log 254 may comprise conversation context between the chatbot and the user, such as, messages from the user or the chatbot during the current conversation or previous conversations, responses by the chatbot or the user during the current conversation or previous conversations, etc. Herein the conversation context may refer to records of conversation contents in conversations.

The database 250 may comprise a data set 255. The data set 255 may comprise various types of resource or service information from various partner entities. Herein "resource" may refer to contents related to products to be recommended to the user, for example, document, article, music, image, video, etc., and "service" may refer to any service provided by, for example, the partner entities, for example, various ticket subscription service, travel service, order service, etc. The partner entities may be producers, sellers or provider of commodities or providers of services from which the chatbot may obtain information about the service or resource.

The chatbot system 200 may comprise a module set 260 which is a collection of functional modules that may be operated by the core processing module 220 to generate or obtain messages and/or responses.

The module set 260 may comprise a relevance module 261 that may be configured for determining relevance of messages and responses to ensure relevant response to a message. The relevance of messages and responses may be determined through any existing techniques, for example, through Question-Answer (QA) pairs.

The module set 260 may comprise a topic determination module 262. The topic determination module 262 may be configured for determining topic during a conversation, such as implicit topic and/or explicit topic in the topic graph. For example, the initial implicit topic may be determined based at least on conversation context in the conversation log 254 and/or user profile in the user profile 253. As an alternative way, the initial implicit topic during the conversation may be selected randomly from the topic graph. As another example, an intermediate implicit topic may be determined based at least on one or more of conversation context, user profile, relevance between the intermediate implicit topic and the initial implicit topic. As a further example, an explicit topic may be determined based at least on one or more of conversation context, user profile, relevance between the explicit topic and the initial implicit topic and/or the intermediate implicit topic. Herein the relevance between the intermediate implicit topic and the initial implicit topic, and the relevance between the explicit topic and the initial implicit topic and/or the intermediate implicit topic includes one or more of causal relation, coordinate relation, alternative relation, adversative relation, progressive relation, hyponymy relation, contrast relation, and so on and may also indicate a weight between the two topics.

The module set 260 may comprise a message providing module 263. The message providing module 263 may be configured for providing message including the determined topic during the conversation.

The module set 260 may comprise a delivery module 264. The delivery module 264 may be configured for delivering resource or service based on the explicit topic.

The core processing module 220 may provide the generated responses to a response queue or response cache 232. For example, the response cache 232 may ensure that a sequence of responses can be displayed in a pre-defined time stream. Assuming that, for a message, there are no less than two responses generated by the core processing module 220, then a time-delay setting for the responses may be necessary. For example, if a message inputted by the user is "Did you eat your breakfast?", two responses may be generated, such as, a first response "Yes, I ate bread" and a second response "How about you? Still feeling hungry?". In this case, through the response cache 232, the chatbot may ensure that the first response is provided to the user immediately. Further, the chatbot may ensure that the second response is provided in a time delay, such as 1 or 2 seconds, so that the second response will be provided to the user 1 or 2 seconds after the first response. As such, the response cache 232 may manage the to-be-sent responses and appropriate timing for each response.

The responses in the response queue or response cache 232 may be further transferred to the UI 210, such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
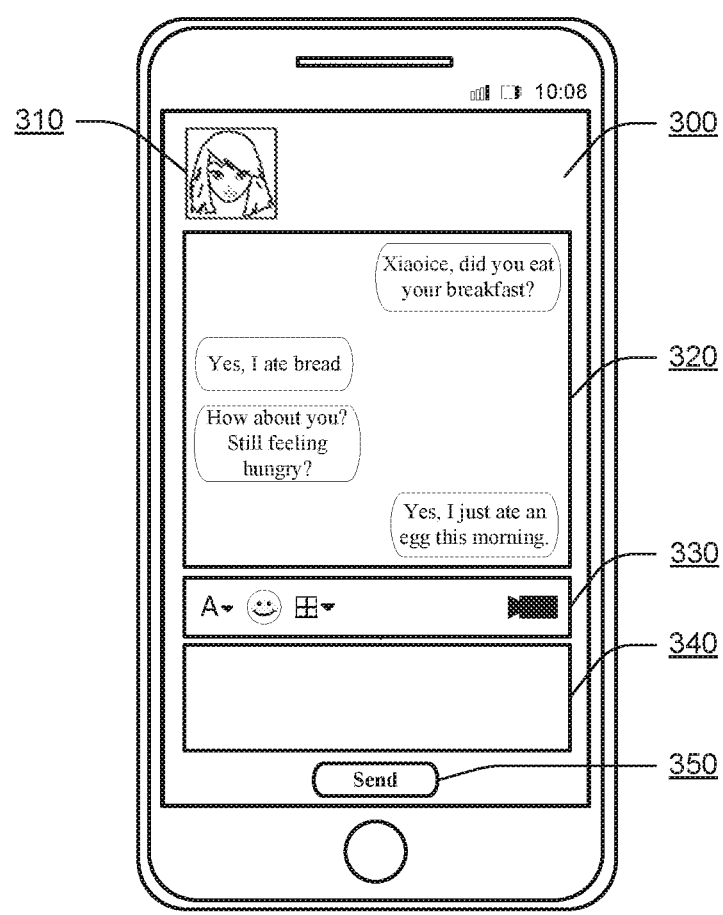
FIG. 3 illustrates an exemplary user interface according to an embodiment.

FIG. 3 illustrates an exemplary user interface 300 according to an embodiment.

The user interface 300 may be included in a terminal device, and may comprise a chatbot icon 310, a presentation area 320, a control area 330 and an input area 340. The chatbot icon 310 may be a photo or picture representing the chatbot, such as logo, name and homepage URL of the chatbot. The presentation area 320 may display a chat window that may contain messages and responses in a session between a user and the chatbot. The control area 330 may include a plurality of virtual buttons for the user to perform message input settings. For example, the user may select to make a voice input, attach image files, select emoji symbols, make a short-cut of the current screen, activate camera, make a voice call or video conversation with the chatbot, etc. through the control area 330. The input area 340 may be used by the user for inputting messages. For example, the user may type text through the input area 340. The user interface 300 may further comprise a virtual button 350 for confirming to send the inputted messages. If the user touches the virtual button 350, the messages inputted in the input area 340 may be sent to the presentation area 320.

It should be appreciated that all the elements and their layout shown in FIG. 3 are exemplary. Depending on specific application requirements, the user interface in FIG. 3 may omit or add any elements, and the layout of the elements in the user interface in FIG. 3 may also be changed in various approaches. For example, although the messages and responses are shown in a form of text in the presentation area 320, the messages and responses may also be in a form of speech. Accordingly, the chatbot and the user may chat by voices.

Figure 4:
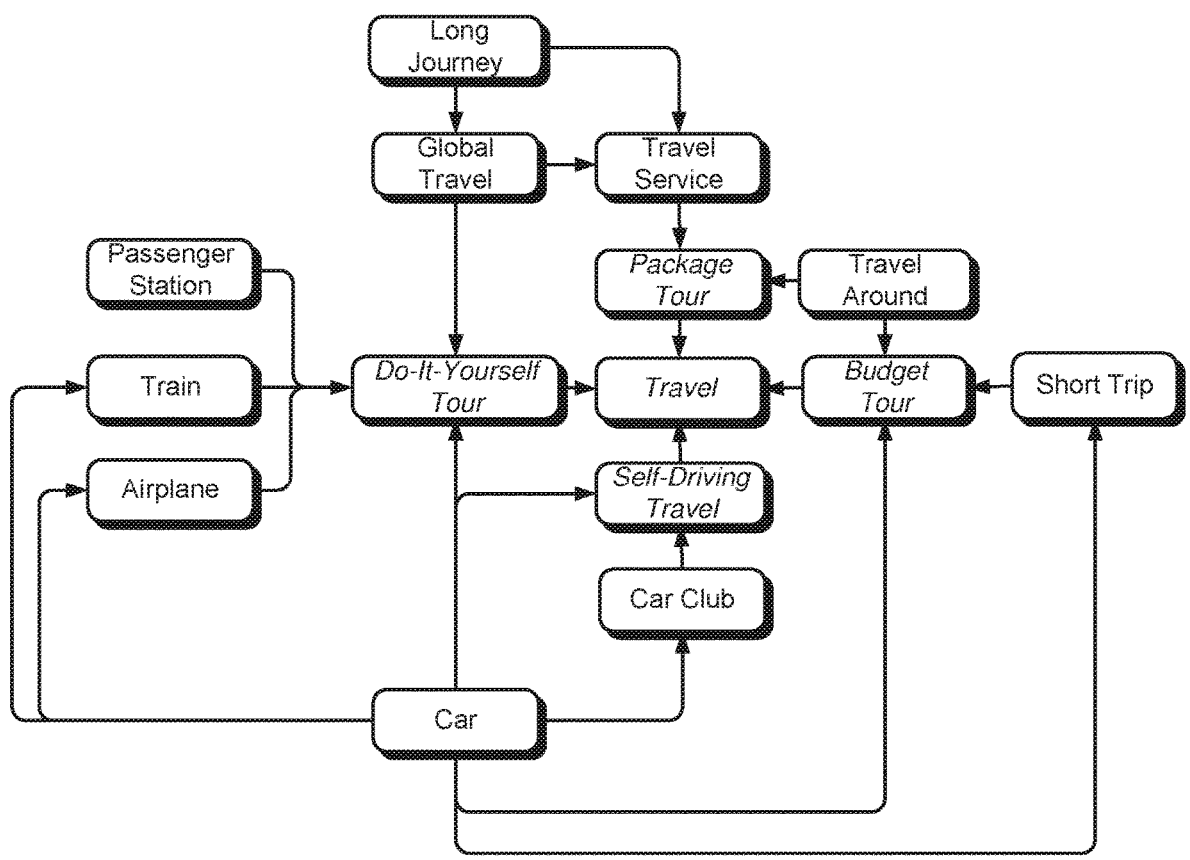
FIG. 4 illustrates an exemplary general topic graph according to embodiments.

FIG. 4 illustrates an exemplary general topic graph according to embodiments.

In FIG. 4 and following drawings herein, content in an italic form in a block of the topic graph represents an explicit topic or a target topic, and content in other blocks of the topic graph represents an implicit topic, for example, an initial implicit topic or an intermediate implicit topic. There are five explicit topics in total in FIG. 4, topic "Package Tour", "Budget Tour", "Self-Driving Travel", "Do-It-Yourself Tour" and "Travel", and there are ten implicit topics in FIG. 4, for example, topic "Car", "Car Club", "Short Trip", "Airplane", "Train", "Passenger Station", "Long Journey", "Global Travel", "Travel Service" and "Travel Around".

A line with arrow between two nodes in the topic graph represents relevance between two topics in the topic graph, wherein the arrow represents guidance or switching between the two topics.

Taking the topic graph 400 in FIG. 4 as an example, it shows a topic guidance from a current topic or an initial implicit topic "Car" to a target topic "Travel". In this example, there are four sub-target topic "Package Tour", "Budget Tour", "Self-Driving Travel", and "Do-It-Yourself Tour" of the target topic "Travel". For each sub-target topic, there are several initial or intermediate implicit topic connected to it. For example, as shown in FIG. 4, an implicit topic "Car" may be connected to several implicit topics, such as "Car Club", "Short Trip", "Airplane", "Train", and to several explicit topics, such as "Do-It-Yourself Tour", "Self-Driving Travel" and "Budget Tour". Further, implicit topic "Long Journey" and "Passenger Station" do not connect with an implicit topic "Car"; that is, in this topic graph, these topics "Long Journey" and "Passenger Station" are not associated with the topic "Car".

In the exemplary topic graph, there may be different weights of relevance between different pairs of topics. For example, in the example shown in FIG. 4, the weight of relevance between a topic "Car" and a topic "Self-Driving Travel" may be highest among the weights of relevance between the topic "Car" and each other topics. That means, when current topic is "Car", the next possible topic to be switched may be the topic "Self-Driving Travel". As an alternative way, during the topic guidance or switching in the conversation, when determining a next topic to be switched from the current topic, a topic having second highest weight of relevance with respect to the current topic may be selected rather than the topic having highest weight of relevance. For example, in the example shown in FIG. 4, the weight of relevance between the topic "Car" and the topic "Budge Tour" may be second highest. During the switching of topic, the next topic to be switched from the current topic "Car" may be selected as "Budget Tour". A next topic to be switched from the current topic during a conversation herein may be selected or determined by utilizing any suitable manner.

It should be appreciated that all the topics shown in FIG. 4 are exemplary, and depending on specific application requirements, any other topics may be involved in the topic graph 400.

Figure 5A:
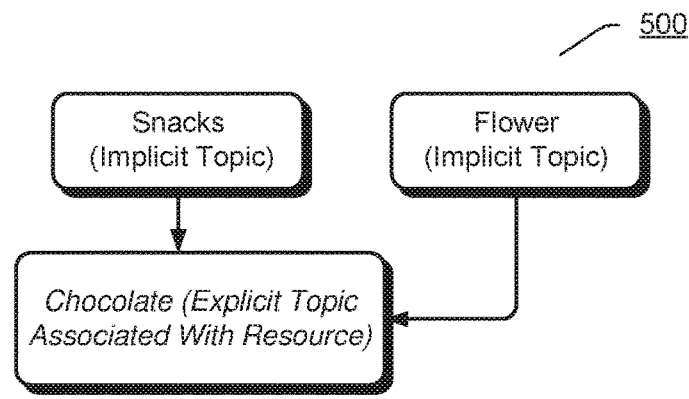
FIG. 5A illustrates an exemplary topic graph according to an embodiment.

FIG. 5A illustrates an exemplary topic graph 500 according to an embodiment. For simplicity, the exemplary topic graph 500 is given as a simple example. Herein there is only one explicit topic "Chocolate" in this topic graph 500, which is associated with resource such as a document "How to make chocolate at home". There are two implicit topics "Snacks" and "Flower" in this topic graph 500, wherein both of the topics "Snack" and "Flower" are connected to the explicit topic "Chocolate", and these two implicit topics "Snack" and "Flower" are not connected with each other.

It should be appreciated that all the topics shown in FIG. 5A are exemplary, and depending on specific application requirements, any other topics may be involved in the topic graph 500 and there may be more than one explicit topic or one or more implicit topics in the topic graph.

Figure 5B:
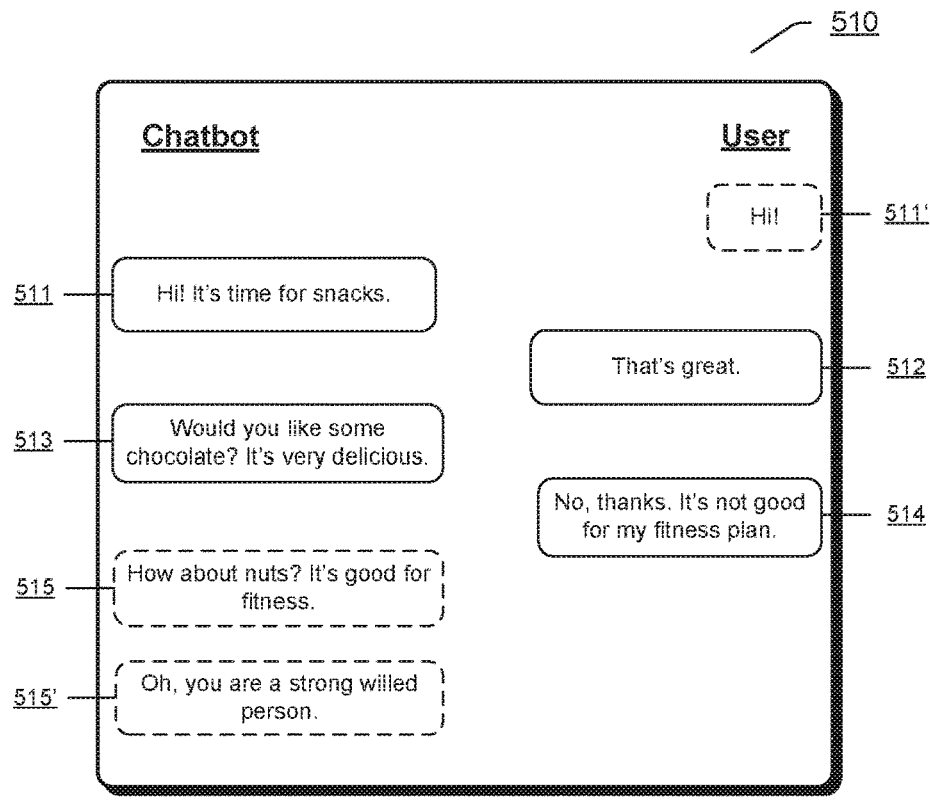
FIG. 5B illustrates an exemplary chat window between a user and a chatbot for guiding topic according to the embodiment of FIG. 5A.

FIG. 5B illustrates an exemplary chat window 510 between a user and a chatbot for guiding topic according to the embodiment of FIG. 5A.

In this exemplary chat window 510, the conversation may be initiated by the chatbot, for example, by the chatbot saying "Hi! It's time for snacks", shown at 511 in the chat window 510. Alternatively, the conversation may be initiated by the user, for example, by the user saying "Hi", shown at 511' by dashed box in the chat window 510. An initial topic "Snacks" is determined by the chatbot and presented to the user through the first message "Hi! It's time for snacks", which indicates the topic "Snacks". The initial topic "Snacks" is known as an implicit topic in connection with the topic graph 500, as this topic is not associated with any resources or services. The user provides a first response as "That's great" shown at 512 to the first message provided by the chatbot. Based on the response from the user, the chatbot may determine that the first response is associated with the implicit topic "Snacks", which indicates that the user is interested to this topic, and determine a further topic, such as an explicit topic "Chocolate" shown in the topic graph 500. This explicit topic may be indicated in a second message "Would you like some chocolate? It's very delicious" and may be provided to the user shown at 513 by presenting the second message through the user interface. This topic "Chocolate" is associated with an article "How to make chocolate at home", which is also referred as target topic.

The user provides a second response to the second message, as shown at 514, which is "No, thanks. It's not good for my fitness plan" and may be considered as a negative response to the target/explicit topic. Based on the second response from the user, the chatbot may determine that the user is not interested in the explicit topic "Chocolate" and may not deliver a document of "How to make chocolate at home". Then the chatbot may determine a new topic such as "Nut", which is not shown in the topic graph 500, and indicate the new topic in a message "How about nuts? It's good for fitness", as shown at 515, wherein such message indicating new topic may be generated based at least on a negative response from the user to the previous explicit topic. Alternatively, the chatbot may end the conversation or the target topic by providing a message as "Oh, you are a strong willed person", as shown at 515'.

Figure 5C:
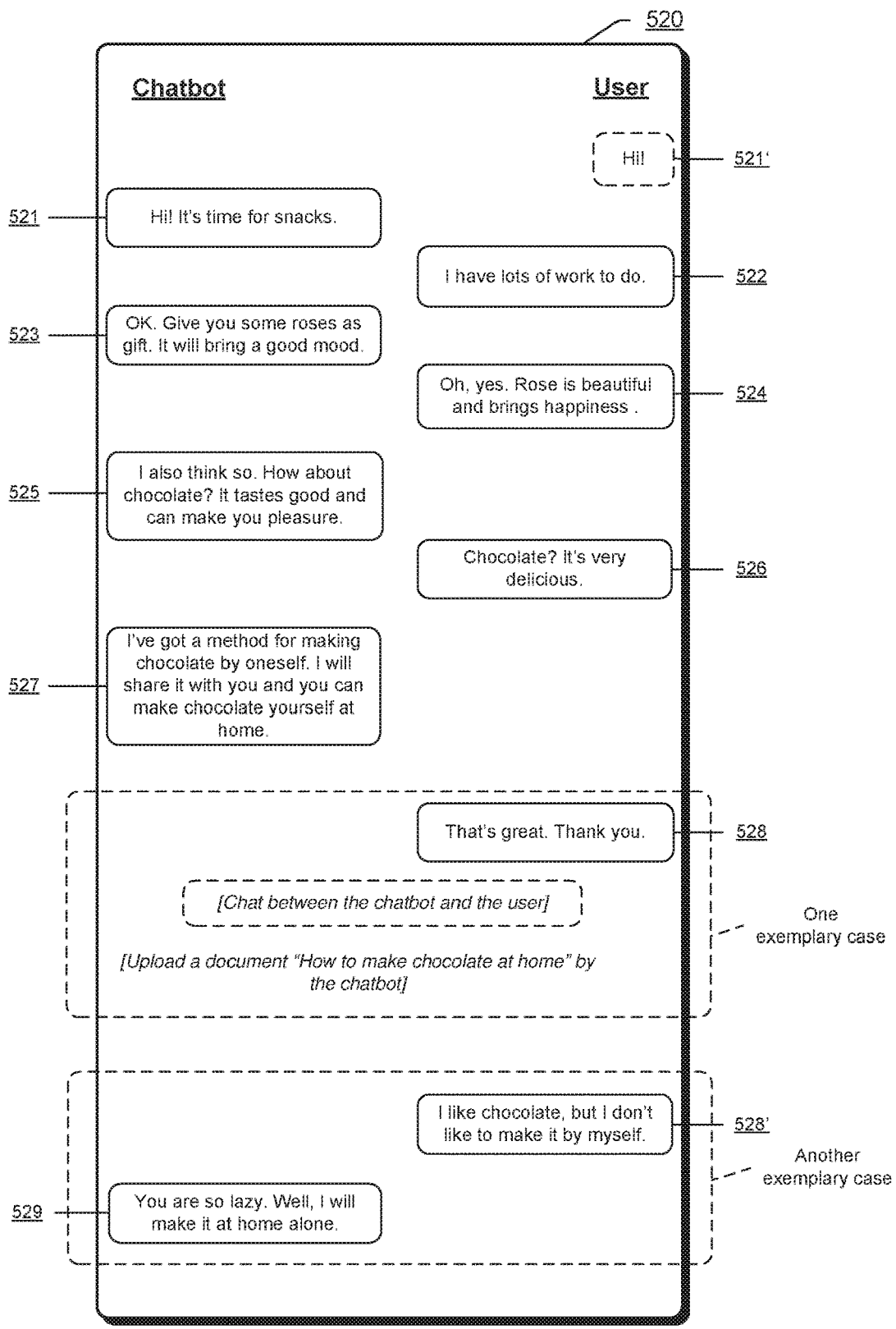
FIG. 5C illustrates another exemplary chat window between a user and a chatbot for guiding topic according to the embodiment of FIG. 5A.

FIG. 5C illustrates another exemplary chat window 520 between a user and a chatbot for guiding topic according to the embodiment of FIG. 5A.

As shown in FIG. 5C, the user saying "Hi", shown at 521' by dashed box in the chat window 510 may be similar to 511' in FIG. 5B. When the chatbot provide a first message as "Hi! It's time for snacks" shown at 521 which is similar to 511, the user may be not interested to the topic "Snacks" indicated in the first message. For example, the user may respond or reply by "I have lots of work to do" which may be not associated with the topic "Snacks", as shown at 522. When the chatbot determines that the response from the user is not associated with the topic provided by the chatbot, it may switch the topic from the current implicit topic to another implicit topic. For example, as shown in FIG. 5C in connection with the topic graph in FIG. 5A, the chatbot may determine another implicit topic as "Flower", and switch the topic from "Snacks" to "Flower". The topic "Flower" shown in FIG. 5A is connected to the explicit topic "Chocolate" and not connected to the current implicit topic "Snacks". The determined implicit topic "Flower" may be indicated by a word "Rose" in the second message, as shown in FIG. 5C. A second message "OK. Give you some roses as gift. It will bring a good mood" may be provided by the chatbot, in which the topic "Flower" is indicated by the word "Rose" in the second message, as shown at 523. The user may be interested to the topic "Flower" and provide or present a second response as "Oh, yes. Rose is beautiful and brings happiness" to the chatbot, which is associated with the topic "Flower", as shown at 524. Based on this response from the user, the chatbot may determine that the response from the user is associated with the topic "Flower", which indicates that the user is interested to the topic "Flower" indicated by the word "Rose" in the message, and may determine the explicit topic "Chocolate" based at least on the response and the previous topic "Flower" which is connected to the explicit topic in the topic graph. The determined explicit topic is indicated in the third message and provided by the chatbot to the user, such as "I also think so. How about chocolate? It tastes good and can make you pleasure", as shown at 525. This explicit topic is associated with resource, for example, a document "How to make chocolate at home". The user provides or presents a message "Chocolate? It's very delicious", which is associated with the explicit topic "chocolate", as shown at 526, to respond to the previous message provided by the chatbot. Upon receiving this message from the user, the chatbot may determine that the user is interested to the explicit topic "Chocolate" and may start a process for delivering document by providing a message as "I've got a method for making chocolate by oneself. I will share it with you and you can make chocolate yourself at home", as shown at 527.

In this case, there may be different responses from the user to the message provided by the chatbot during the process for delivering document, as shown in dashed boxes in FIG. 5C. In one exemplary case, the user may give a positive response to the resource about chocolate, such as "That's great. Thank you", as shown at 528. Based on such positive response from the user, the chatbot may perform the task by providing or uploading a document "How to make chocolate at home" to the user. As an alternative way, before the chatbot performs the process for delivering the document, it may chat with the user several turns about the determined target topic in the conversation.

As another exemplary case, the user may give a negative response to the resource of chocolate, such as "I like chocolate, but I don't like to make it by myself", as shown at 528'. When receiving such negative response, the chatbot may determine that the user is not interesting about the resource or service associated with the target topic. Based on such determination, the chatbot may end the conversation by saying, for example, "You are so lazy. Well, I will make it at home alone", as shown at 529, or may provide another topic to the user, not shown in FIG. 5C.

Figure 6A:
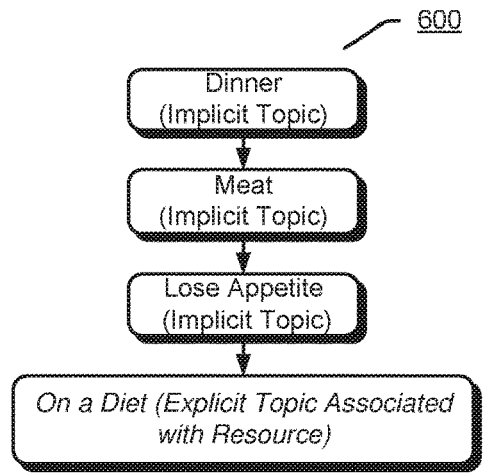
FIG. 6A illustrates another exemplary topic graph according to an embodiment.

FIG. 6A illustrates another exemplary topic graph 600 according to an embodiment. Herein there is only one explicit topic "On a Diet" in this topic graph 600, which is associated with resource or service, for example, a document "How to cook delicious vegetable dish". There are three implicit topics "Dinner", "Meat" and "Lose Appetite" in this topic graph 600. As shown in FIG. 6A, the current topic or initial implicit topic "Dinner" is connected to an intermediate implicit topic "Meat", and the intermediate implicit topic "Meat" is in turn connected to another intermediate implicit topic "Lose Appetite". The intermediate implicit topic "Lose Appetite" is connected to a target topic "On a Diet", as shown in the topic graph 600.

It should be appreciated that all the topics shown in FIG. 6A are exemplary, and depending on specific application requirements, any other topics may be involved in the topic graph 600 and there may be more than one explicit topic or one or more implicit topics in the topic graph.

Figure 6B:
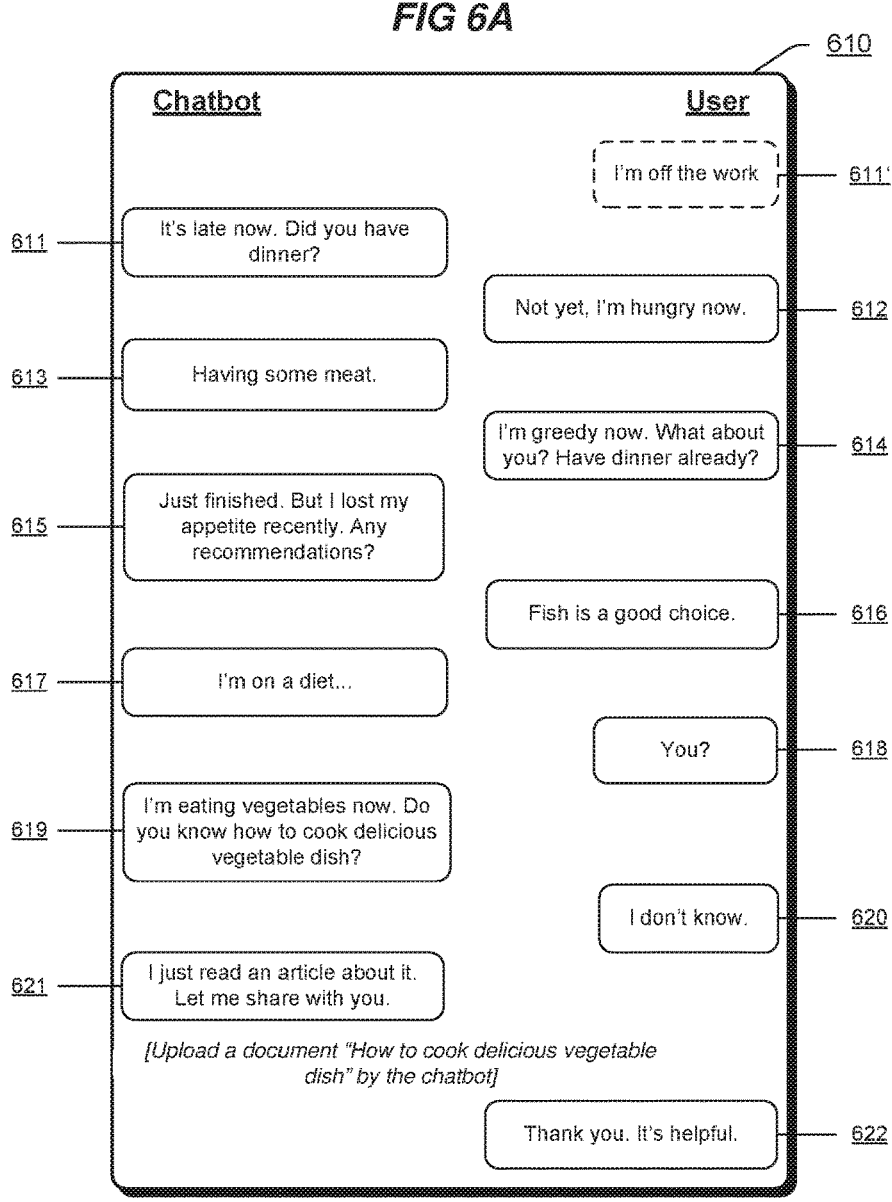
FIG. 6B illustrates an exemplary chat window between a user and a chatbot for guiding topic according to the embodiment of FIG. 6A.

FIG. 6B illustrates an exemplary chat window 610 between a user and a chatbot for guiding topic according to the embodiment of FIG. 6A.

In this exemplary chat window 610, the conversation may be initiated by the chatbot, for example, by the chatbot saying "It's late now. Did you have dinner?" shown at 611 in the chat window 610. Alternatively, the conversation may be initiated by the user, for example, by the user saying "I'm off the work", as shown at 611' by dashed box in the chat window 610. An initial topic "Dinner" is determined by the chatbot and presented to the user through the first message "It's late now. Did you have dinner?", which indicates the determined topic "Dinner". The initial topic "Dinner" is known as an implicit topic in connection with the topic graph 600, as this topic is not associated with any resource or service. The user provides a first response as "Not yet, I'm hungry now" to the first message at 611, which is associated with the topic "Dinner", as shown at 612. Based on the response from the user, the chatbot may determine that the response from the user is associated with the topic "Dinner" which indicates that the user is interested in the implicit topic "Dinner", and determine a further topic, such as an implicit topic "Meat" shown in the topic graph 600. This implicit topic may be indicated by a second message "Having some meat" and be provided to the user by presenting the second message through the user interface, as shown at 613. This topic "Meat" is not associated with any resource or service, which is also referred as intermediate implicit topic. The user provides a second response "I'm greedy now. What about you? Have dinner already?" to the second message by the chatbot, which is associated with the topic "Meat", as shown at 614. Upon receiving this second response, the chatbot may determine that the user is interested to the intermediate implicit topic "Meat". Based on such determination, the chatbot may determine a further intermediate implicit topic "Lose Appetite", which is indicated by a phrase "lost my appetite" in a third message. The chatbot may generate and provide or present a third message indicating the intermediate implicit topic "Lose Appetite", which is "Just finished. But I lost my appetite recently. Any recommendations?" shown at 615. The user may chat with the chatbot and give a third response as "Fish is a good choice" to the chatbot, which is associated with the topic "Lose Appetite". Based on the received third response from the user, the chatbot may determine that the user continues to be interested in the further implicit topic "Lose Appetite". Based on this determination, the chatbot may determine an explicit topic or a target topic "On a Diet" and provide the explicit topic to the user by indicating the explicit topic in a message "I'm on a diet . . . " shown at 617. From the user's response "You?" as shown at 618, the chatbot may determine that the response from the user is associated with the topic "On a Diet" which indicates that the user is interested in the explicit topic "On a Diet" and may start to perform a process for delivering resource or service, for example, a document "How to cook delicious vegetable dish". After chatting with the user through one or more turns of dialogues, as shown at 619, 620, 621, the chatbot may deliver or upload the document "How to cook delicious vegetable dish" to the user. Optionally, after delivering the resource or service, the chatbot may receive feedback to the resource or service from the user, for example, a feedback of "Thank you. It's helpful" as shown at 622 in chat window 610.

Although each message shown in the above examples only includes one topic, it should be appreciated that the chatbot may determine several different topics each time and each message or response provided by the chatbot may include several different topics. And it also should be appreciated that any message or response herein may be generated further based at least on user profile, conversation context.

Figure 7:
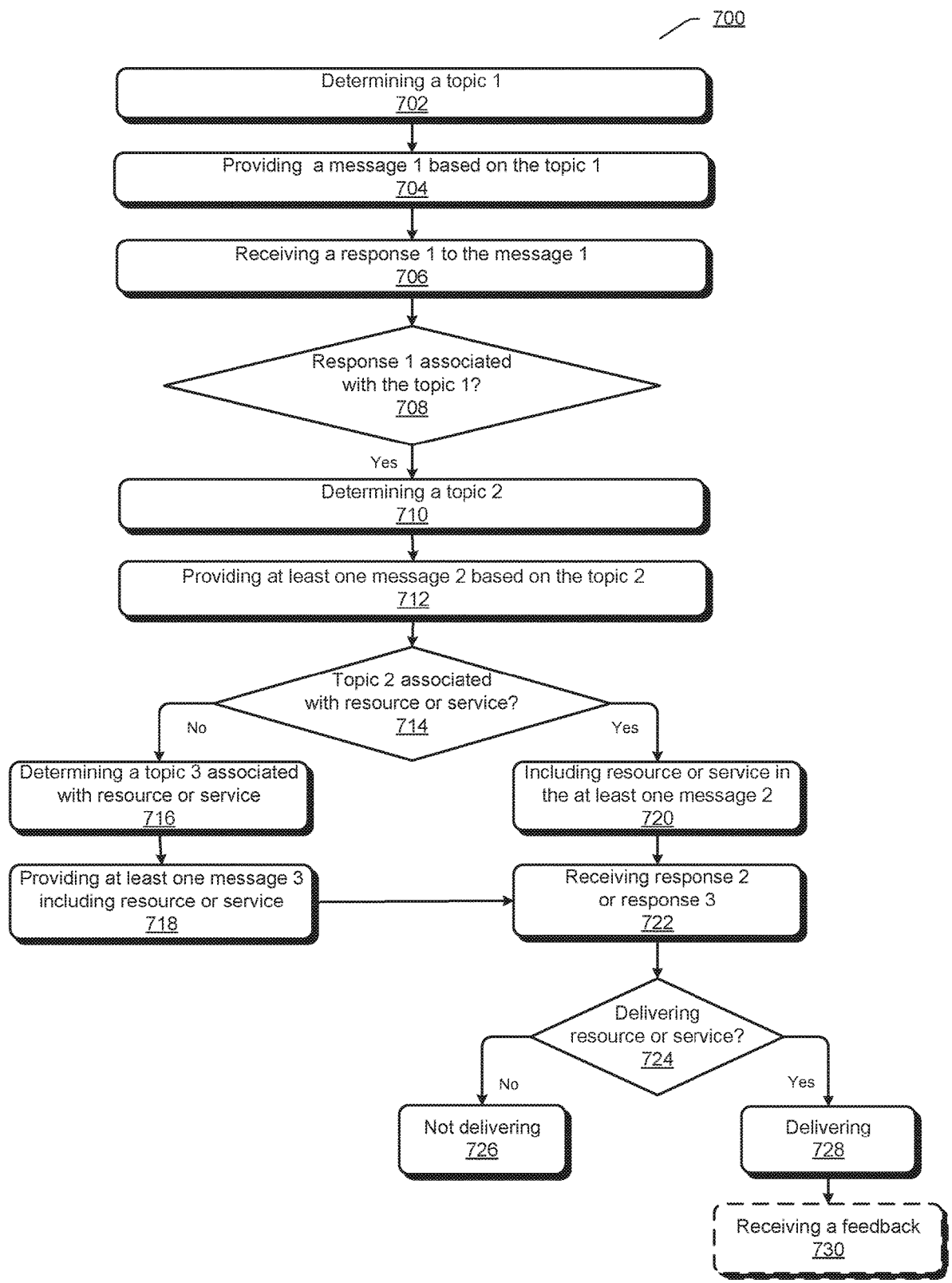
FIG. 7 illustrates an exemplary process for guiding topic according to an embodiment.

FIG. 7 illustrates an exemplary process 700 for guiding topic according to an embodiment. In one implementation, the exemplary process 700 may be performed by a chatbot during a conversation between the chatbot and a user. Through the process 700, a current topic may be switched or guided to another topic during the conversation.

At 702, the chatbot may determine a topic 1 based at least on user profile and/or conversation context from a topic graph. This topic 1 may be an implicit topic in this example.

Optionally, a message may be received from the user before the step 702. Herein, the message may refer to one or more current or latest messages from the user. The message may be in a form of text, speech, image, etc. Since a speech or image message may be converted to a corresponding text message, the following discussion will take text message as an example.

At 704, when determining the implicit topic 1, a message indicating the implicit topic 1 may be generated and/or provided to the user. The implicit topic 1 may be indicated by a word or a phrase in the message.

At 706, a response 1 to the message 1 may be received from the user. Based on the received response 1, the chatbot may determine, at 708, whether the response 1 is associated with the implicit topic 1, which may indicate whether user is interested in the topic 1.

If the determination result is "Yes" in 708, the process may proceed to step 710.

At 710, as the response 1 is associated with the implicit topic 1 which indicates that the user is interested in the topic 1, the chatbot may determine a topic 2 based on the implicit topic 1, for example as topic "Chocolate" shown in FIG. 5A or topic "Meat" shown in FIG. 6A. Further, the topic 2 may be determined based at least one of conversation context, user profile, relevance between the topic 2 and the topic 1, and any combination thereof.

When the topic 2 is determined, at 712, at least one message 2 may be provided based at least on the topic 2. The at least one message 2 may indicate the topic 2 through a word or a phrase in the at least one message 2.

At 714, the chatbot may determine whether the topic 2 is associated with resource or service, that is, whether the topic 2 is an explicit topic.

If the determination is "No", that means, the topic 2 is not an explicit topic, the process may proceed to 716. At 716, the chatbot may determine a topic 3, which may be associated with service or resource and may be considered as explicit topic, such as "Lose Appetite" shown in FIG. 6A.

At 718, at least one message 3 indicating the determined topic 3 and/or including the resource or service may be generated or provided by the chatbot to the user based at least on the topic 3. The process may proceed to step 722 if the explicit topic 3 is determined.

Alternatively, if the determination is "Yes", that is, the topic 2 is an explicit topic, the process may proceed to 720. At 720 based on the explicit topic 2, the chatbot may include resource or service in the at least one message 2.

When the user received the message 2 or the message 3, the user may provide or present a response 2 to the message 2 or response 3 to the message 3. Correspondingly, at 722, the chatbot may receive the response 2 or response 3 from the user.

At 724, the chatbot may determine whether to deliver the resource or service, based at least on the response 2 or response 3. For example, if the response 2 or response 3 is a positive response, it may indicate that the user is interested in the resource or service. If the response is a negative response, it may indicate that the user is not interested in the resource or service.

Based on the determination result, there may be different operations. For example, as shown at 726, if the determination result is "No", the chatbot may not deliver the resource or service. If the determination result is "Yes", as shown at 728, the chatbot may proceed to deliver the resource or service.

Optionally, at 730, the user may provide a feedback to the resource or service and thus the chatbot may receive the feedback from the user to improve the resource or service correspondingly.

The exemplary case for the determination result being "No" in 708 will be described in FIG. 8.

Figure 8:
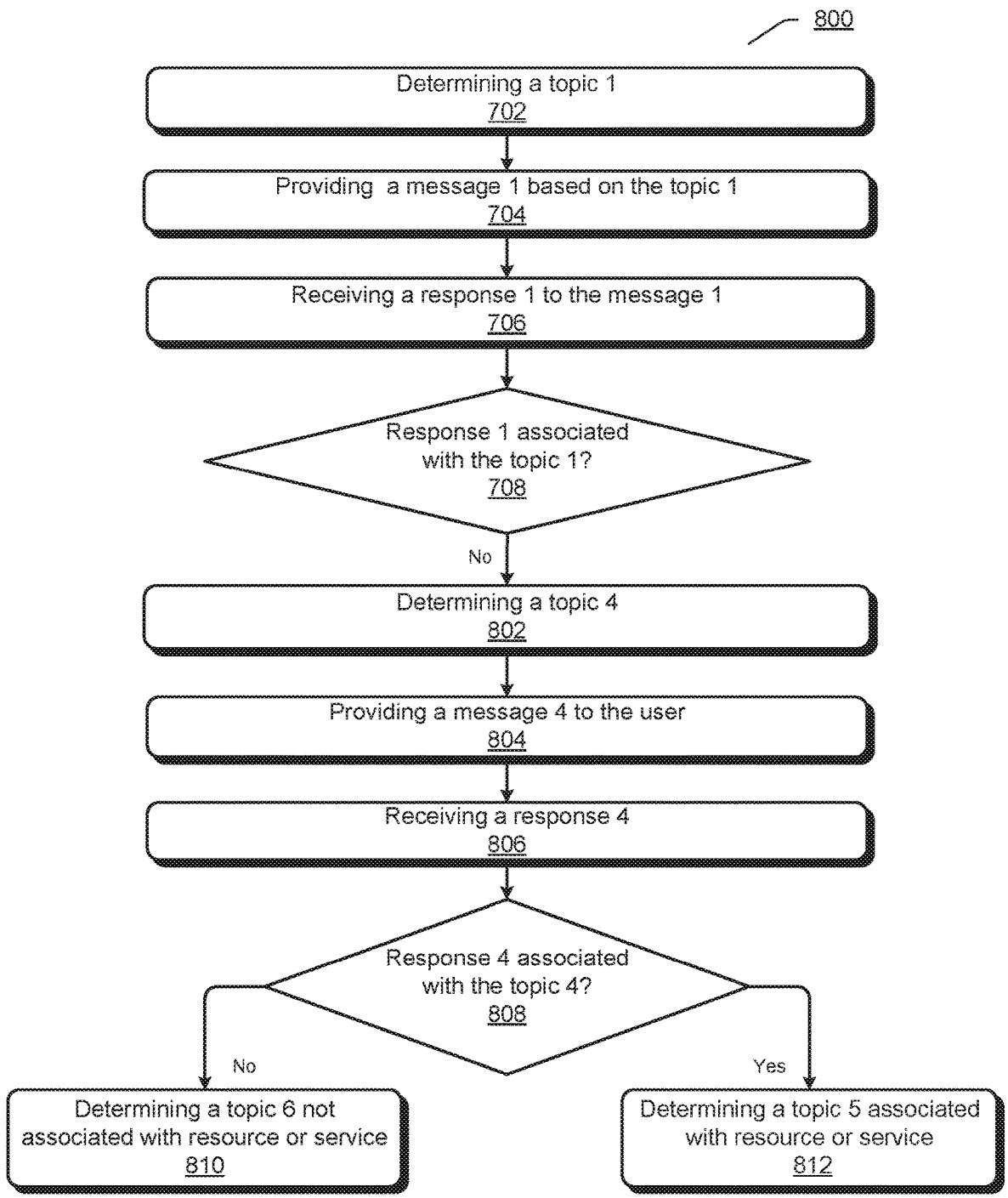
FIG. 8 illustrates another exemplary process for guiding topic according to an embodiment.

FIG. 8 illustrates another exemplary process 800 for guiding topic according to an embodiment.

Steps 702-708 are the same as that shown in FIG. 7, there may be not described these steps in FIG. 8 for simplicity.

If the determination result in 708 is "No", then the process may proceed to step 802.

At 802, the chatbot may determine a topic 4 based on the topic 1. The topic 4 may be not associated with the topic 1, and may be shown as not connecting to the topic 1 in a topic graph, as the implicit topic "Flower" shown in FIG. 5A.

At 804, upon determining the topic 4, the chatbot may generate or provide a message 4 to the user based on the topic 4, wherein the topic 4 may be indicated by a word or a phrase in the message 4.

At 806, the chatbot may receive a response 4 to the message 4 from the user. Such response 4 may be associated or not associated with the topic 4.

At 808, the chatbot may determine whether the response 4 received from the user is associated with the topic 4, which indicates whether the user is interested to the topic 4. Herein the response 4 being associated with the topic 4 means that the user is interested to the topic 4, otherwise means that the user is not interested to the topic 4.

According to the determination result, there may be different operations. For example, as shown at 810, if the determination result in 808 is "No", that is, the response is not associated with the topic 4, which indicates that the user is not interested in the topic 4, the chatbot may determine a new implicit topic 6 not associated with the resource or service and may continue to perform steps similar with the previous process for guiding the conversation from an implicit topic to an explicit topic such as in FIG. 7.

If the determination result in 808 is "Yes", the chatbot may determine at 812 a topic 5 based at least on the topic 4, which may be associated with resource or service and may be considered as an explicit topic, as the explicit topic "On a Diet" shown in FIG. 6A and FIG. 6B. When the explicit topic is determined, the process may continue to perform steps similar with the previous process for delivering resource or service such as in FIG. 7.

Figure 9:
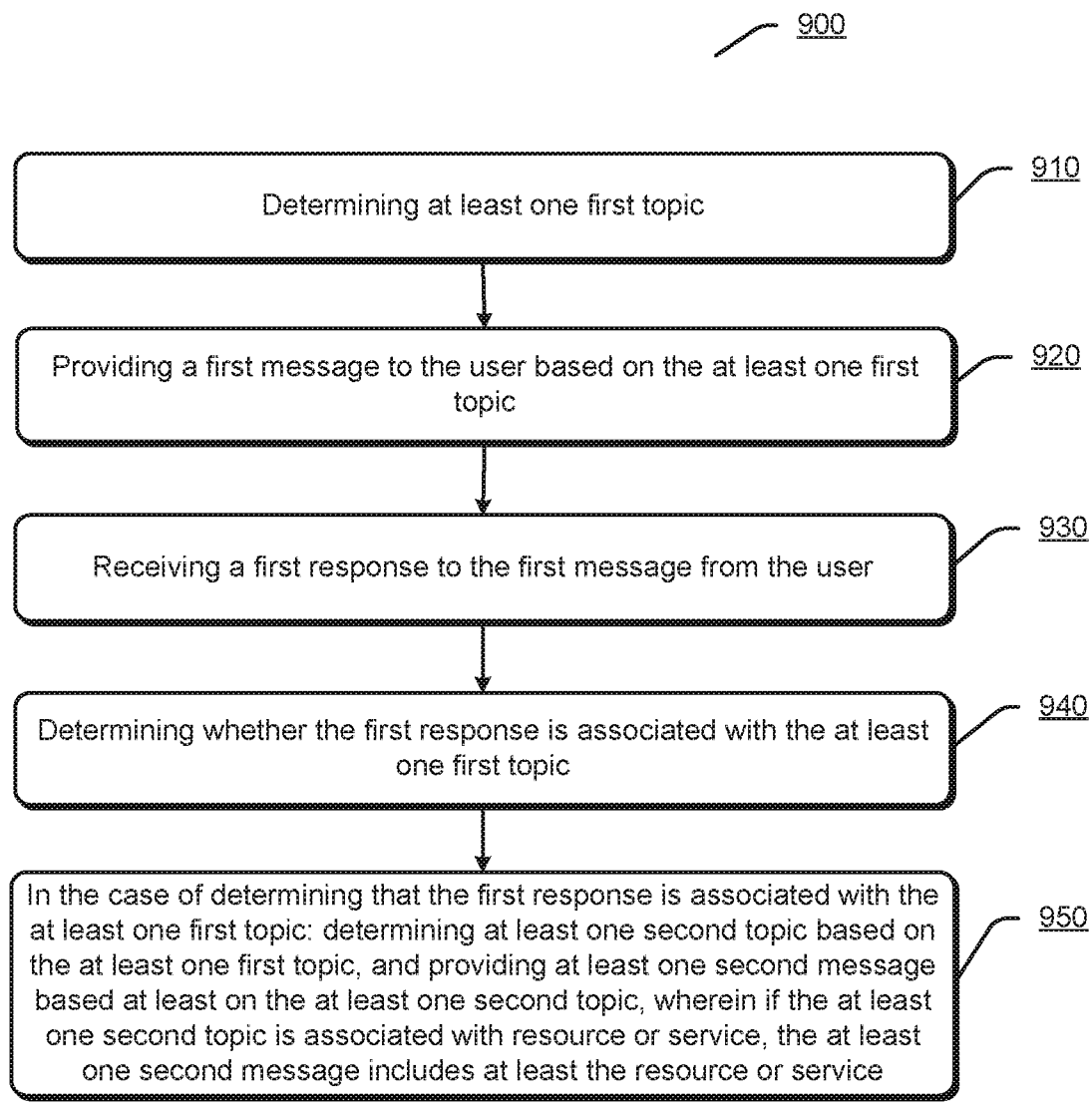
FIG. 9 illustrates a flowchart of an exemplary method for guiding topic in a conversation between a user and a chat engine according to an embodiment.

FIG. 9 illustrates a flowchart of an exemplary method 900 for guiding topic in a conversation between a user and a chat engine according to an embodiment.

At 910, at least one first topic may be determined in a conversation. Such topic determination may be in connection with a topic graph.

At 920, a first message may be provided to the user based at least on at least one first topic. In some implementations, the first message may be used to guide the conversation to the at least one first topic.

At 930, a first response to the first message may be received from the user. In some implementations, the first response may be associated with the first topic.

At 940, it may be determined whether the first response is associated with the at least one first topic.

At 950, in the case of determining that the first response is associated with the at least one first topic: at least one second topic may be determined based on the at least one first topic, and at least one second message may be provided based at least on the at least one second topic, wherein if the at least one second topic is associated with resource or service, the at least one second message includes at least the resource or service.

In an implementation, if the at least one second topic is not associated with the resource or service, the method may further comprise: determining at least one third topic based on the at least one second topic, the at least one third topic being associated with the resource or service; and providing at least one third message based at least on the at least third topic, wherein the at least third message may include at least the resource or service.

In an implementation, the at least one first topic may be determined based on at least one of conversation context and user profile. In an implementation, the at least one second topic may be further determined based on at least one of: conversation context, user profile, relevance between the at least one second topic and the at least one first topic. In some implementation, the at least one third topic may be further determined based on at least one of: conversation context, user profile, relevance between the at least one third topic and the at least one second topic.

In an implementation, each of the relevance between the at least one second topic and the at least one first topic and the relevance between the at least one third topic and the at least one second topic may include at least one of: causal relation, coordinate relation, alternative relation, adversative relation, progressive relation, hyponymy relation, contrast relation.

In an implementation, the first message may be provided further based on at least one of conversation context and user profile, and wherein the at least one second message may be provided further based on at least one of conversation context, user profile and the first response.

In an implementation, the at least one first topic may be indicated by a word or a phrase in the first message and the at least one second topic may be indicated by a word or a phrase in the at least one second message.

In an implementation, the method may further comprise: in the case of determining that the first response is not associated with the at least one first topic: determining at least one fourth topic; providing a fourth message to the user based on the at least one fourth topic; receiving a fourth response to the fourth message from the user; determining whether the fourth response is associated with the fourth topic; and in the case of determining that the fourth response is associated with the fourth topic; determining at least one fifth topic based on the at least one fourth topic, and providing at least one fifth message based at least on the at least one fifth topic, wherein if the at least one fifth topic is associated with resource or service, the at least one fifth message includes at least the resource or service.

In an implementation, the fourth message may be provided further based on the first response and the fifth message may be provided further based on the fourth response.

In an implementation, the at least one fourth topic may be indicated by a word or a phrase in the fourth message, and the at least one fifth topic may be indicated by a word or a phrase in the at least one fifth message.

In an implementation, the at least one fourth topic may be determined based on at least one of conversation context and user profile. In an implementation, the at least one fifth topic may be determined based on at least one of: conversation context, user profile, relevance between the at least one fifth topic and the at least one fourth topic.

In an implementation, the method may further comprise: receiving at least one second response to the at least one second message from the user; and determining whether to deliver the resource or service based on the at least one second response.

In an implementation, in the case of determining to deliver the resource or service, the method may further comprise: receiving a feedback to the resource or service from the user.

It should be appreciated that the method 900 may further comprise any steps/processes for guiding topic in a conversation between a user and a chat engine according to the embodiments of the present disclosure as mentioned above.

Figure 10:
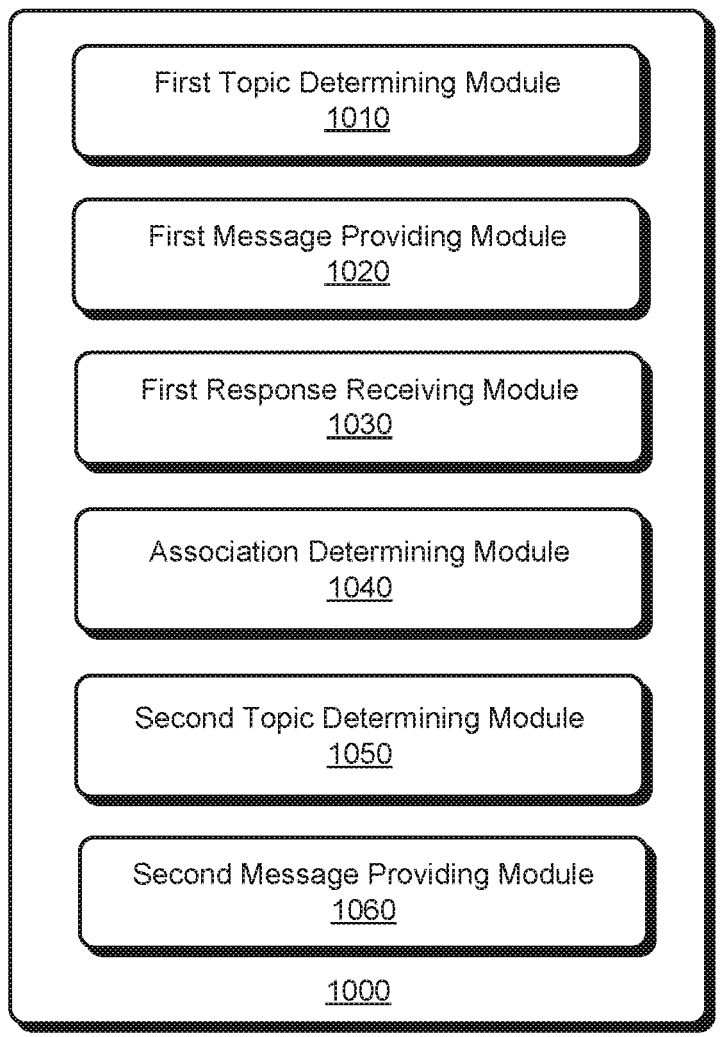
FIG. 10 illustrates an exemplary apparatus for guiding topic in a conversation between a user and a chat engine according to an embodiment.

FIG. 10 illustrates an exemplary apparatus 1000 for guiding topic in a conversation between a user and a chat engine according to an embodiment.

The apparatus 1000 may comprise a first topic determining module 1010, for determining at least one first topic; a first message providing module 1020, for providing a first message to the user based on the at least one first topic, to guide the conversation to the at least one first topic; a first response receiving module 1030, for receiving a first response to the first message from the user; an association determining module 1040, for determining whether the first response is associated with the at least one first topic; a second topic determining module 1050, for determining at least one second topic based on the at least one first topic, in the case of determining that the first response is associated with the at least one first topic; and a second message providing module 1060, for providing at least one second message based at least on the at least one second topic, wherein if the at least one second topic is associated with resource or service, the at least one second message may include at least the resource or service.

In an implementation, if the at least one second topic is not associated with resource or service, the apparatus may further comprise a third topic determining module, for determining at least one third topic based on the at least one second topic, the at least one third topic being associated with the resource or service; and a third message providing module, for providing at least one third message based at least on the at least third topic, wherein the at least third message may include at least the resource or service.

In an implementation, the at least one first topic may be determined based on at least one of conversation context and user profile, the at least one second topic may be further determined based on at least one of: conversation context, user profile, relevance between the at least one second topic and the at least one first topic, and the at least one third topic may be further determined based on at least one of: conversation context, user profile, relevance between the at least one third topic and the at least one second topic.

In an implementation, in the case of determining that the first response is not associated with the at least one first topic, the apparatus may further comprise a fourth topic determining module, for determining at least one fourth topic; a fourth message providing module, for providing a fourth message to the user based on the at least one fourth topic, to guide the conversation from the at least one first topic to the at least one fourth topic; a fourth response receiving module, for receiving a fourth response to the fourth message from the user. In one implementation, the association determining module 1040 may be further for determining whether the fourth response is associated with the fourth topic. In one implementation, in the case of determining that the fourth response is associated with the fourth topic, the apparatus may further comprise: a fifth topic determining module, for determining at least one fifth topic based on the at least one fourth topic; and a fifth message providing module, for providing at least one fifth message based at least on the at least one fifth topic, wherein if the at least one fifth topic is associated with resource or service, the at least one fifth message includes the resource or service.

In an implementation, the at least one fourth topic may be determined based on at least one of conversation context and user profile, and the at least one fifth topic may be further determined based on at least one of: conversation context, user profile, relevance between the at least one fifth topic and the at least one fourth topic.

In an implementation, the apparatus 1000 may further comprise a second response receiving module, for receiving at least one second response to the at least one second message from the user; and a delivery determining module, for determining whether to deliver the resource or service based on the at least one second response.

In an implementation, in the case of determining to deliver the resource or service, the apparatus may further comprise: a receiving module, for receiving a feedback to the resource or service from the user.

Moreover, the apparatus 1000 may also comprise any other modules configured for guiding topic in a conversation between a user and a chat engine according to the embodiments of the present disclosure as mentioned above.

Figure 11:
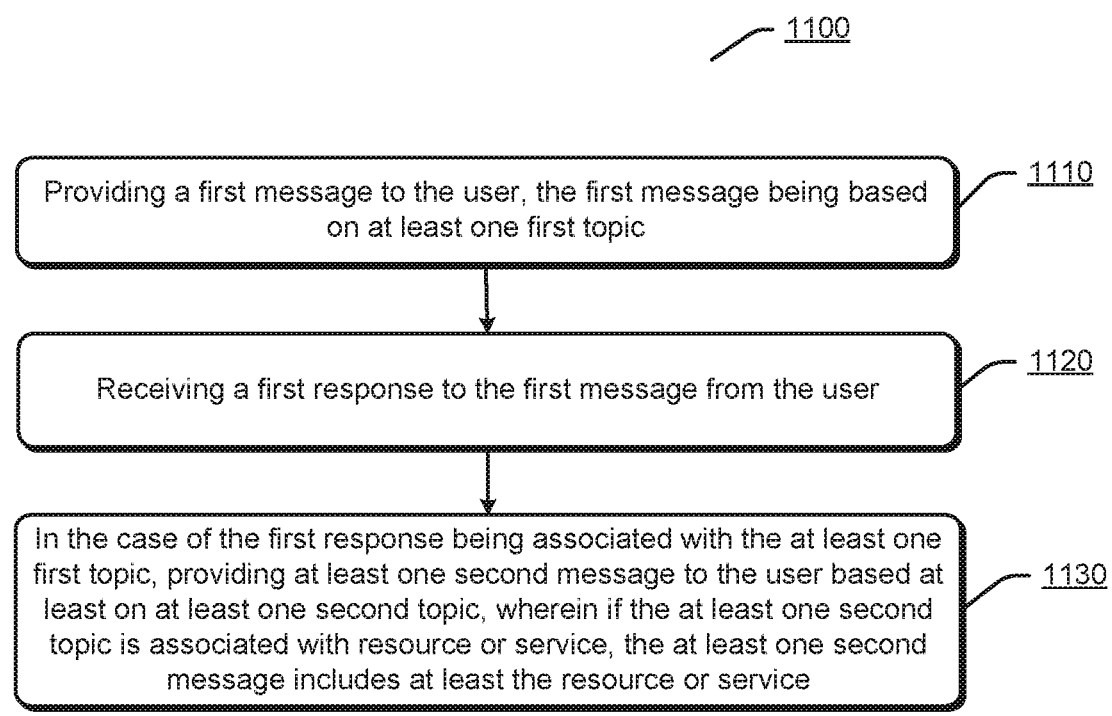
FIG. 11 illustrates a flowchart of another exemplary method for guiding topic in a conversation between a user and a chat engine according to an embodiment.

FIG. 11 illustrates a flowchart of another exemplary method 1100 for guiding topic in a conversation between a user and a chat engine according to an embodiment.

At 1110, a first message may be provided to the user based at least on at least one first topic. In some implementations, the first message may be used to guide the conversation to the at least one first topic.

At 1120, a first response to the first message may be received from the user. In some implementations, the first response may be associated with the at least one first topic.

At 1130, in the case of the first response being associated with the at least one first topic: at least one second message may be provided to the user based at least on at least one second topic, wherein if the at least one second topic is associated with resource or service, the at least one second message may include at least the resource or service.

It should be appreciated that the method 1100 may further comprise any steps/processes for guiding topic in a conversation between a user and a chat engine according to the embodiments of the present disclosure as mentioned above.

Figure 12:
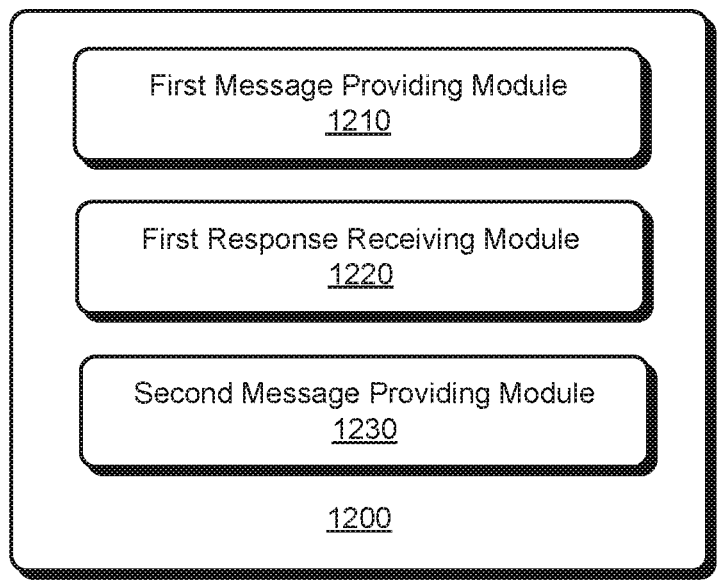
FIG. 12 illustrates another exemplary apparatus for guiding topic in a conversation between a user and a chat engine according to an embodiment.

FIG. 12 illustrates another exemplary apparatus 1200 for guiding topic in a conversation between a user and a chat engine according to an embodiment.

The apparatus 1200 may comprise a first message providing module 1210, for providing a first message to the user based on the at least one first topic; a first response receiving module 1220, for receiving a first response to the first message from the user; and a second message providing module 1230, for providing at least one second message to the user based at least on at least one second topic, in the case of the first response being associated with the at least one first topic, wherein if the at least one second topic is associated with resource or service, the at least one second message includes at least the resource or service.

Moreover, the apparatus 1200 may also comprise any other modules configured for guiding topic in a conversation between a user and a chat engine according to the embodiments of the present disclosure as mentioned above.

Figure 13:
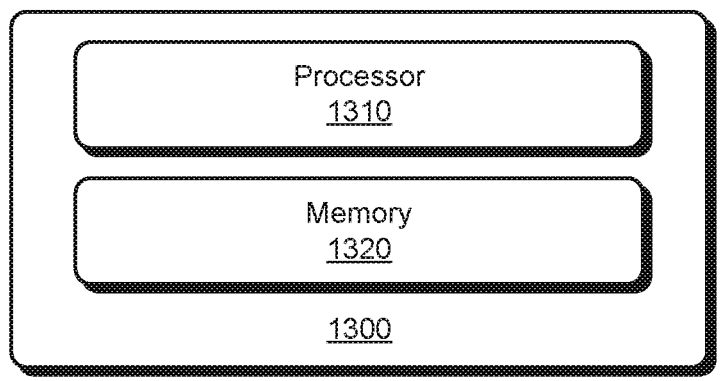
FIG. 13 illustrates an exemplary apparatus for guiding topic in a conversation between a user and a chat engine according to an embodiment.

FIG. 13 illustrates an exemplary apparatus for guiding topic in a conversation between a user and a chat engine according to an embodiment.

The apparatus 1300 may comprise one or more processors 1310 and a memory 1320 storing computer-executable instructions.

In one implementation, when executing the computer-executable instructions, the one or more processors 1310 may be configured to: determine at least one first topic; provide a first message based on the at least one first topic to the user; receive a first response to the first message from the user; determine whether the first response is associated with the at least one first topic; and in the case of determining that the first response is associated with the at least one first topic: determine at least one second topic based on the at least one first topic; and if the at least one second topic is associated with resource or service, provide at least one second message based at least on the at least one second topic.

In another implementation, when executing the computer-executable instructions, the one or more processors 1310 may be also configured to: provide a first message to the user, the first message being based on at least one first topic; receive a first response to the first message from the user; in the case of the first response being associated with the at least one first topic, provide at least one second message to the user, based at least on at least one second topic, wherein if the at least one second topic is associated with resource or service, the at least one second message may include at least the resource or service.

The embodiments of the present disclosure may be embodied in a non-transitory computer-readable medium. The non-transitory computer-readable medium may comprise instructions that, when executed, cause one or more processors to perform any operations of the methods for providing a response to a user in a question-answering session according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for guiding topic in a conversation between a user and a chat engine, the method comprising:
    learning conversational topic distribution and shifting from a chat message corpus;
    generating a topic graph using the conversational topic distribution and shifting, the topic graph comprising topic nodes for topics aligned using a word alignment model;
    determining at least one first topic for the conversation from the topic graph based in part on an implicit topic present in a chat log of the user;
    providing a first message to the user via a chat user interface based on the at least one first topic;
    receiving a first response to the first message from the user from the chat user interface;
    determining whether the first response is associated with the at least one first topic; and
    determining that the first response is associated with the at least one first topic:
        selecting at least one second topic from the topic graph based on a weight of relevance between the at least one second topic and the at least one first topic; and
        providing at least one second message via the chat user interface based at least on the at least one second topic, wherein if the at least one second topic is associated with resource or service, the at least one second message includes at least the resource or service.

2. The method of claim 1, wherein if the at least one second topic is not associated with the resource or service, the method further comprising:
    determining at least one third topic based on the at least one second topic, the at least one third topic being associated with the resource or service; and
    providing at least one third message based at least on the at least one third topic, wherein the at least one third message includes at least the resource or service.

3. The method of claim 2, wherein,
    the at least one first topic is determined based on at least one of conversation context and user profile,
    the at least one second topic is further determined based on at least one of: conversation context, user profile, relevance between the at least one second topic and the at least one first topic, and
    the at least one third topic is further determined based on at least one of: conversation context, user profile, relevance between the at least one third topic and the at least one second topic.

4. The method of claim 3, wherein each of the relevance between the at least one second topic and the at least one first topic and the relevance between the at least one third topic and the at least one second topic includes at least one of: causal relation, coordinate relation, alternative relation, adversative relation, progressive relation, hyponymy relation, contrast relation.

5. The method of claim 1, wherein the first message is provided further based on at least one of conversation context and user profile, and wherein the at least one second message is provided further based on at least one of conversation context, user profile and the first response.

6. The method of claim 1, wherein the at least one first topic is indicated by a word or a phrase in the first message and the at least one second topic is indicated by a word or a phrase in the at least one second message.

7. The method of claim 1, further comprises:
    determining that the first response is not associated with the at least one first topic:
        determining at least one fourth topic;
        providing a fourth message to the user based on the at least one fourth topic;

receiving a fourth response to the fourth message from the user;
determining whether the fourth response is associated with the at least one fourth topic; and
determining that the fourth response is associated with the at least one fourth topic:
determining at least one fifth topic based on the at least one fourth topic, and
providing at least one fifth message based at least on the at least one fifth topic, wherein if the at least one fifth topic is associated with resource or service, the at least one fifth message includes at least the resource or service.

8. The method of claim 7, wherein the fourth message is provided further based on the first response, and the at least one fifth message is provided further based on the fourth response.

9. The method of claim 7, wherein the at least one fourth topic is indicated by a word or a phrase in the fourth message, and the at least one fifth topic is indicated by a word or a phrase in the at least one fifth message.

10. The method of claim 7, wherein,
the at least one fourth topic is determined based on at least one of conversation context and user profile, and the at least one fifth topic is determined based on at least one of: conversation context, user profile, relevance between the at least one fifth topic and the at least one fourth topic.

11. The method of claim 1, further comprising:
receiving at least one second response to the at least one second message from the user; and
determining whether to deliver the resource or service based on the at least one second response.

12. The method of claim 11, wherein determining to deliver the resource or service, the method further comprises:
receiving a feedback to the resource or service from the user.

13. An apparatus for guiding topic in a conversation between a user and a chat engine comprising:
at least one processor; and
memory comprising instructions that, when executed by the at least one processor, cause the at least one processor to perform operations to:
learn conversational topic distribution and shifting from a chat message corpus;
generate a topic graph using the conversational topic distribution and shifting, the topic graph comprising topic nodes for topics aligned using a word alignment model;
determine at least one first topic for the conversation from the topic graph based in part on an implicit topic present in a chat log of the user;
provide a first message to the user via a chat user interface based on the at least one first topic, to guide the conversation to the at least one first topic;
receive a first response to the first message from the user;
determine whether the first response is associated with the at least one first topic; and
select at least one second topic from the topic graph based on a weight of relevance between the at least one second topic and the at least one first topic:
determine that the first response is associated with the at least one first topic; and
provide at least one second message via the chat user interface based at least on the at least one second topic, wherein if the at least one second topic is associated with resource or service, the at least one second message includes at least the resource or service.

14. The apparatus of claim 13, wherein if the at least one second topic is not associated with resource or service, the memory further comprising instructions that, when executed by the at least one processor, cause the at least one processor to perform operations to:
determine at least one third topic based on the at least one second topic, the at least one third topic being associated with the resource or service; and
provide at least one third message based at least on the at least one third topic, wherein the at least one third message includes at least the resource or service.

15. The apparatus of claim 14, wherein,
the at least one first topic is determined based on at least one of conversation context and user profile,
the at least one second topic is further determined based on at least one of: conversation context, user profile, relevance between the at least one second topic and the at least one first topic, and
the at least one third topic is further determined based on at least one of: conversation context, user profile, relevance between the at least one third topic and the at least one second topic.

16. The apparatus of claim 13, wherein determining that the first response is not associated with the at least one first topic, the memory further comprises instructions that, when executed by the at least one processor, cause the at least one processor to perform operations to:
determine at least one fourth topic;
provide a fourth message to the user based on the at least one fourth topic, to guide the conversation from the at least one first topic to the at least one fourth topic;
receive a fourth response to the fourth message from the user;
determine whether the fourth response is associated with the at least one fourth topic;
determine that the fourth response is associated with the at least one fourth topic, the memory further comprising instructions that, when executed by the at least one processor, cause the at least one processor to perform operations to: determine at least one fifth topic based on the at least one fourth topic; and
providing at least one fifth message based at least on the at least one fifth topic, wherein if the at least one fifth topic is associated with resource or service, the at least one fifth message includes the resource or service.

17. The apparatus of claim 16, wherein,
the at least one fourth topic is determined based on at least one of conversation context and user profile, and the at least one fifth topic is further determined based on at least one of: conversation context, user profile, relevance between the at least one fifth topic and the at least one fourth topic.

18. The apparatus of claim 13, the memory further comprising instructions that, when executed by the at least one processor, cause the at least one processor to perform operations to:
receive at least one second response to the at least one second message from the user; and
determine whether to deliver the resource or service based on the at least one second response.

19. The apparatus of claim 18, the instructions to determine to deliver the resource or service, further comprising instructions that, when executed by the at least one processor, cause the at least one processor to perform operations to:
receive a feedback to the resource or service from the user.

20. At least one non-transitory machine-readable medium comprising instructions for guiding topic in a conversation between a user and a chat engine that, when executed by at least one processor, cause the at least one processor to perform operations to:
learn conversational topic distribution and shifting from a chat message corpus;
generate a topic graph using the conversational topic distribution and shifting, the topic graph comprising topic nodes for topics aligned using a word alignment model;
determine at least one first topic for the conversation from the topic graph based in part on an implicit topic present in a chat log of the user;
provide a first message to the user, the first message being based on the at least one first topic for the conversation;
receive a first response to the first message from the user via a chat user interface; and
upon a determination that the first response is associated with the at least one first topic, provide at least one second message to the user via the chat user interface based at least on at least one second topic selected from the topic graph based on a weight of relevance between the at least one second topic and the at least one first topic, wherein if the at least one second topic is associated with resource or service, the at least one second message includes at least the resource or service.

* * * * *